US011970792B2

(12) United States Patent
Offersen

(10) Patent No.: US 11,970,792 B2
(45) Date of Patent: Apr. 30, 2024

(54) APPARATUS FOR MANUFACTURING REINFORCEMENT MESHES AND A SPINNING STATION THEREFOR

(71) Applicant: SteelMaster Engineering A/S, Hellup (DK)

(72) Inventor: Kurt Offersen, Arslev (DK)

(73) Assignee: PEDAX GMBH (DE)

( * ) Notice: Subject to any disclaimer, the term of this patent is extended or adjusted under 35 U.S.C. 154(b) by 156 days.

(21) Appl. No.: 17/839,957

(22) Filed: Jun. 14, 2022

(65) Prior Publication Data

US 2022/0403561 A1    Dec. 22, 2022

(30) Foreign Application Priority Data

Jun. 16, 2021    (DK) ............................ PA 2021 00642

(51) Int. Cl.
| | | |
|---|---|---|
| B21F 27/02 | (2006.01) |
| B21F 7/00 | (2006.01) |
| B21F 15/04 | (2006.01) |
| B21F 23/00 | (2006.01) |
| B21F 27/00 | (2006.01) |
| B21F 29/02 | (2006.01) |
| C04B 20/00 | (2006.01) |
| D01H 7/86 | (2006.01) |
| D01H 13/04 | (2006.01) |

(52) U.S. Cl.
CPC ............ *D01H 7/868* (2013.01); *B21F 7/00* (2013.01); *B21F 15/04* (2013.01); *B21F 23/00* (2013.01); *B21F 23/007* (2013.01); *B21F 27/00* (2013.01); *B21F 27/02* (2013.01); *B21F 29/02* (2013.01); *C04B 20/0068* (2013.01); *D01H 13/04* (2013.01)

(58) Field of Classification Search
CPC .......... B21F 27/00; B21F 27/02; B21F 29/02
See application file for complete search history.

(56) References Cited

U.S. PATENT DOCUMENTS 7,909,067 B2    3/2011    Offersen

FOREIGN PATENT DOCUMENTS

| CN | 211413502 U | 9/2020 | |
|---|---|---|---|
| DK | 2019 00629 A1 | 2/2021 | |
| EP | 2 315 637 | 5/2011 | |
| FI | 11005 A | 1/1926 | |
| WO | 2005/044484 A1 | 5/2005 | |
| WO | 2006/097100 A1 | 9/2006 | |
| WO | WO-2006097100 A1 * | 9/2006 | .............. B21F 27/02 |

(Continued)

OTHER PUBLICATIONS

Danish Patent and Trademark Office, Search Report, Patent Application No. PA 2021 00642, completed Dec. 14, 2021, 4 pages.

(Continued)

*Primary Examiner* — Bobby Yeonjin Kim
(74) *Attorney, Agent, or Firm* — Ware, Fressola, Maguire & Barber LLP

(57) ABSTRACT

The present invention relates to an apparatus for manufacturing reinforcement meshes and spinning stations therefor. Reinforcement rods to be joined with the spinning wires are supplied by advancing means from the rear end of the apparatus, and a special mechanism prevents that the wire breaks during its encounter with the reinforcement rod.

10 Claims, 5 Drawing Sheets

(56) References Cited

FOREIGN PATENT DOCUMENTS

WO        2008/119357 A1    10/2008
WO    WO-2008119357 A1 * 10/2008   ............. B21F 27/02
WO        2019/124520 A1    10/2009

OTHER PUBLICATIONS

English Abstract for Foreign Patent Document Cite No. 2, CN 211413502 U, 2 pages.
Machine translation of description in Foreign Patent Document Cite No. 2, CN 211413502 U, 7 pages.
English translation of Abstract of Foreign Patent Document Cite. No. 4, FI 11005 A, 1 page.
European Patent Office, extended European search report for application No. EP 22178090.1-1103, dated Nov. 14, 2022, 6 pages.

* cited by examiner

APPARATUS FOR MANUFACTURING REINFORCEMENT MESHES AND A SPINNING STATION THEREFOR

TECHNICAL FIELD OF THE INVENTION

The present invention relates to a method for manufacturing reinforcement meshes, and to an apparatus and spinning station for use in such a method.

BACKGROUND OF THE INVENTION

In attempts to reduce production costs in connection with reinforcement for civil works, particularly reinforcement for larger areas of concrete, such as decks, slabs or other elements, it is known in the art (e.g., WO2008119357 or U.S. Pat. No. 7,909,067) to manufacture reinforcement nets or meshes, typically defining a mesh of reinforcement rods and wires. Such nets or meshes are easy to store and transport because they may be rolled up on a reel.

WO 2006/097100 discloses a method and an apparatus for manufacturing such reinforcement nets or meshes. However, the disclosed apparatus requires a considerable amount of space, at least at one side of the apparatus, since the reinforcement rods to be joined with the wire must be supplied by advancing means from the side of the apparatus, in order to introduce the reinforcement rods between the spinner head and the point where the two wires from each spool of the spinner head meets to be spun. As the nets or meshes may be manufactured in entities having very large dimensions, the space needed for the transversely entering reinforcement rods is substantial.

WO2008119357 seeks to solve this problem by providing an apparatus reinforcement rods to be joined with the wire are supplied by advancing means from the rear end of the apparatus. A particular drawback with this type of apparatus is that the wire has a tendency to break when a reinforcement rod is forced below it during the loading operation.

It is an object of the present invention to solve the above-mentioned problems.

SUMMARY OF THE INVENTION

One aspect relates to a spinning station for an apparatus for manufacturing reinforcement meshes, comprising:
  a spinner head unit adapted to spin a first and a second wire around a reinforcement rod and to subsequently form a wire spacer formed by spinning said two wires around one another;
  an upper wire coil, and a lower wire coil, respectively, said upper wire coil supplying said first wire and said lower wire coil supplying said second wire; wherein said lower wire coil is mounted on said spinner head unit;
    a support extending above and behind said spinner head unit; wherein said upper wire coil is mounted to said support;
    feeding means adapted for introducing a reinforcement rod between said first and second wires from a position behind said spinner head unit to a position in front of said spinner head unit;
  wherein the spinning station further comprises:
    a rod having a first end and a second opposing end, wherein said first end is hingedly connected to said support;
    a first guide wheel rotatably mounted on the second end of said rod; and
    a cylinder unit operably connected to said rod and configured to control the spatial position of said first guide wheel by acting on said rod;
    wherein said first wire is looped around said first guide wheel, whereby said first guide wheel functions as a wire brake;
    wherein said cylinder, by acting on said rod, is configured to position said first guide wheel in a first position where the part of said first wire extending between said spinner head unit and said first guide wheel is relatively tightened, and to position said first guide wheel in a second position where the part of said first wire extending between said spinner head unit and said first guide wheel is relatively loosened.

A second aspect relates to an apparatus for manufacturing reinforcement meshes, the apparatus comprising:
  a plurality of spinning stations in accordance with the present invention, arranged in a side-by-side relationship; and
  a programmable control unit configured to control the synchronous activation of said spinning stations.

It should be noted that embodiments and features described in the context of one of the aspects of the present invention also apply to the other aspects of the invention.

DETAILED DESCRIPTION OF THE INVENTION

Figure 1:
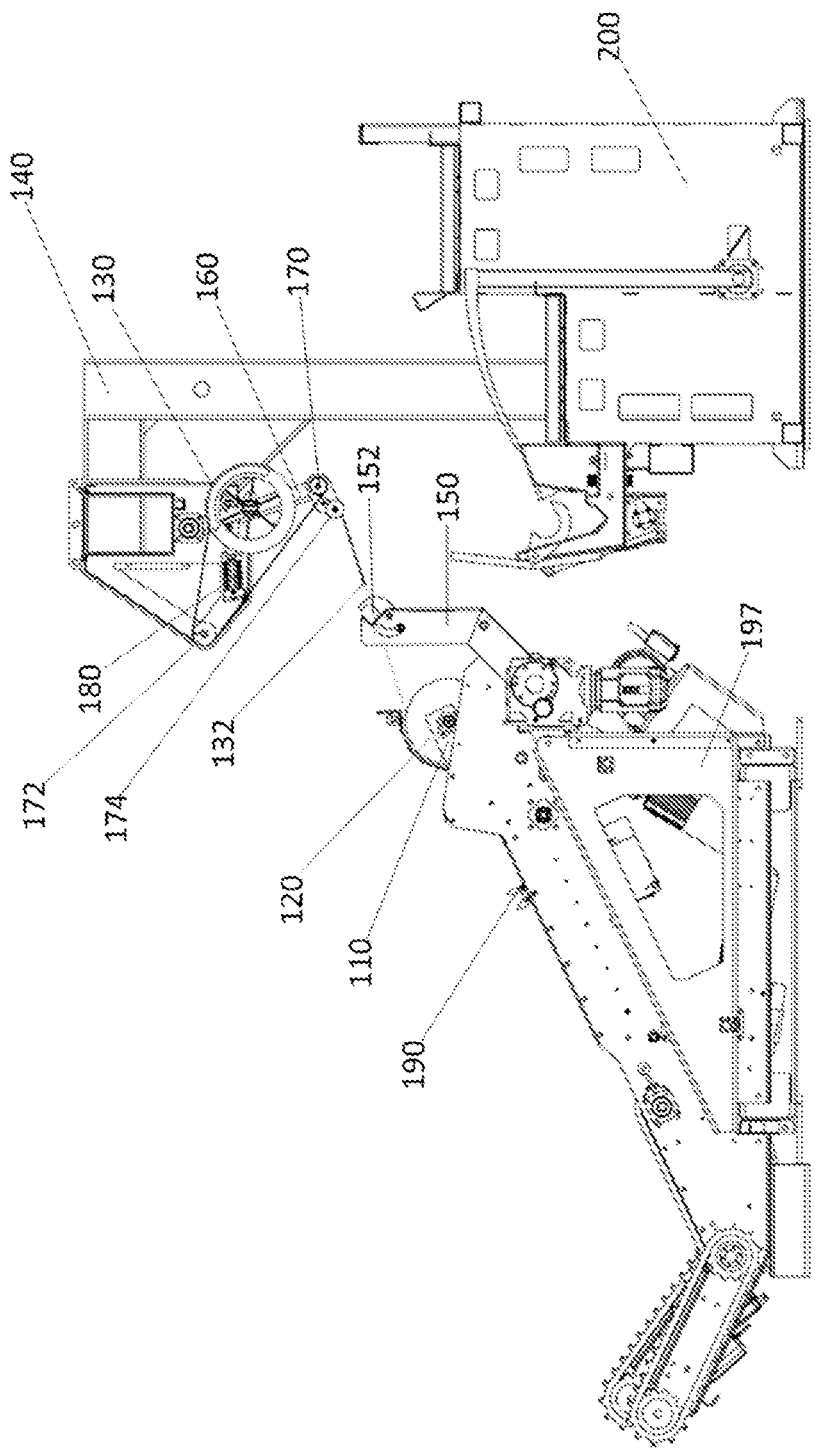
FIG. 1 shows a side view of an apparatus for manufacturing a reinforcement mesh in accordance with various embodiments of the invention.
Figure 5:
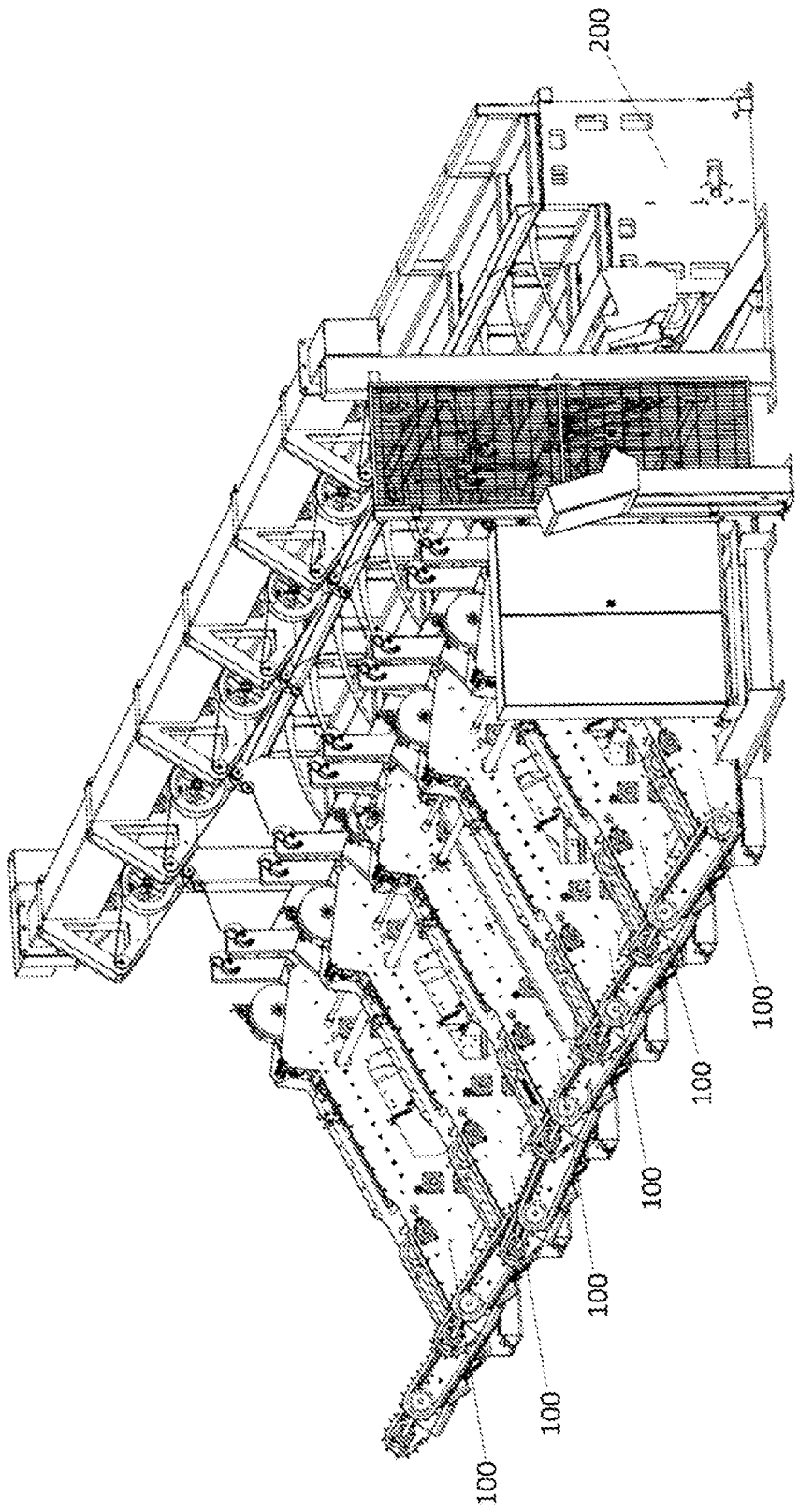
FIG. 5 shows a perspective view of an apparatus with six spinning stations in accordance with various embodiments of the invention.

FIG. 1 shows a side view of an apparatus positioned on a horizontal surface for manufacturing a reinforcement mesh in accordance with various embodiments of the invention. The apparatus comprises a plurality of spinning stations, where only one can be seen due to the side-by-side arrangement. Reinforcement rods are in this embodiment stored in a rack 200 to the rear of the apparatus, i.e., behind an upper wire coil 130 assembly. A lower wire coil assembly 120 is positioned in front of the upper wire coil assembly, shown on the left in FIG. 1. In FIG. 5, six spinning stations 100 may be seen in a perspective view, although the apparatus may comprise any number of spinning stations. The spinning stations 100 are thereby adapted for forming essentially parallel wire binders to form a mesh having the rods being arranged at a desired mutual distance. The wire binders are formed by two wires, which extend respectively above and below each individual reinforcement rod, and which, when being twisted, are clamped around the individual rods. The spinning station comprises a spinner head unit 110, an upper 130, and lower 120 wire coil 130, a support 140, a feeding means 150, a first rod 160 having a first end 162 and a second end 164, a first 170, second 172, and third 174 guide wheel, a cylinder unit 180, and a guide system 190. The feeding means 150 may pick up reinforcement rods from the reinforcement rod rack 200 placed laterally behind the spinning stations 100. The formed reinforcement meshes may be rolled up around itself at mesh rolling means at a lower part of the spinning stations 100, such that the reinforcement rods are kept essentially parallel, and such that the wire binders of the meshes form spiraling paths. The mesh rolling means may preferably be formed by a roll up chain system. There is a space provided in between the lower wire coil 120 assembly situated in front of the upper wire core 130 assembly to allow entry and passage of maintenance personnel who are able to enter the space through a door shown in FIG. 5. A controller is shown laterally aside the door in front of a power panel that may also contain related control equipment.

The spinner head unit 110 is adapted to spin a first 132 and a second (not shown) wire around a reinforcement rod (not shown) and to subsequently form a wire spacer formed by spinning said two wires around one another. The upper wire coil supplies the first wire 132, and the lower wire coil 120 supplies the second wire. The lower wire coil 120 is mounted on the spinner head unit 110. The support 140 extends above and laterally behind the spinner head unit 110, and the upper wire coil 130 is mounted thereon. The feeding means 150 is adapted for introducing a reinforcement rod (not shown) between the first 132 and second wires from a position laterally behind the spinner head unit 110 to a position laterally in front of said spinner head unit 110. These parts of the spinning station are common general knowledge within the art.

The following parts of the spinning station combine to form a mechanism preventing the wire from breaking during the loading operation of a reinforcement rod. The first guide wheel 170 is rotatably mounted on the first rod 160, which is hingedly connected to the support 140. The first wire 132 runs from the upper wire coil 130 via the first guide wheel 170 towards the spinner head unit 110. The cylinder unit 180 is operably connected to the first rod 160 and configured to control the spatial position of the first guide wheel 170 by acting on the first rod 160. The cylinder unit 180, by acting on the first rod 160, is configured to position the first guide wheel 170 in a first position where the part of the first wire 132 extending between the spinner head unit 110 and the first guide wheel 170 is relatively tightened (as shown in FIG. 1), and to position the first guide wheel 170 in a second position where the part of the first wire 132 extending between the spinner head unit 110 and the first guide wheel 170 is relatively loosened (not shown). The first position is needed when the spinner head unit 110 is operating to form the wire spacer, and the second position is needed during the loading operation. When the first wire 132 is loosened, there is less risk of the wire breaking when the reinforcement rod is in contact therewith as the reinforcement rod is guided underneath the first wire 132 in a sliding motion. The friction between the first wire 132 and the reinforcement rod is thereby reduced.

Figure 2:
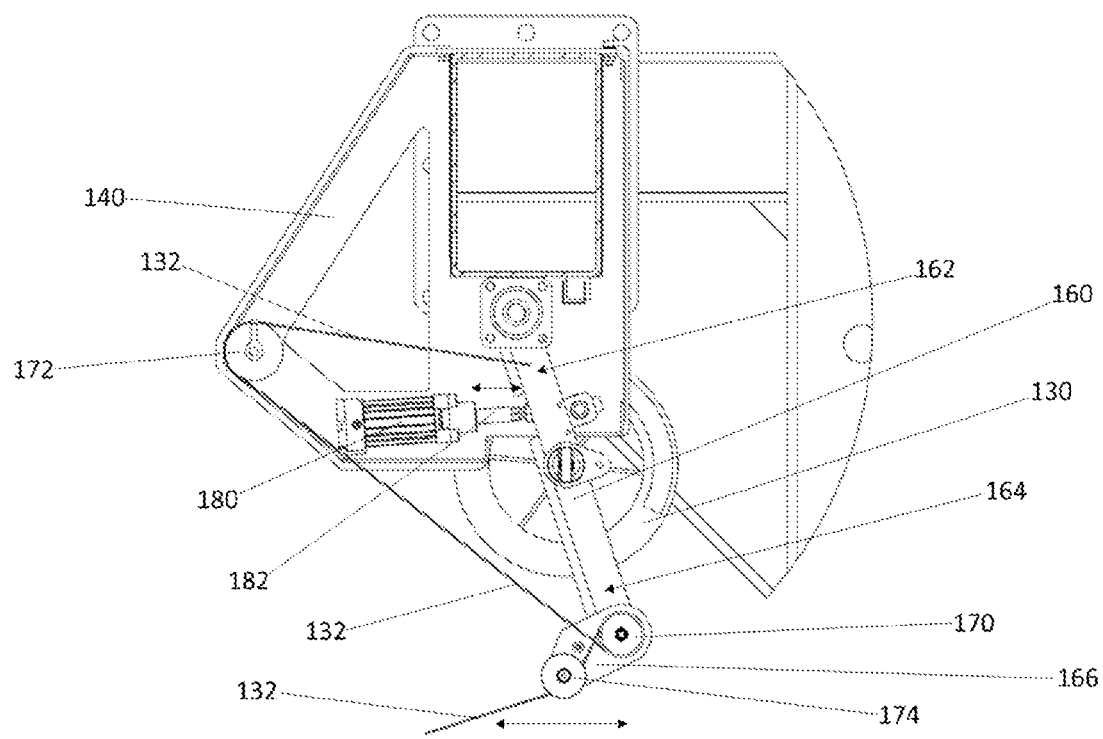
FIG. 2 is an enlarged view of a part of the apparatus shown in FIG. 1 showing a rod and first guide wheel in accordance with various embodiments of the invention.

FIG. 2 is an enlarged view of a part of the apparatus shown in FIG. 1 showing the first rod 160, and the first 170, second 172, and third 174 guide wheels in accordance with various embodiments of the invention, where a part of the upper wire coil 130 has been removed to better show the other parts.

In one or more embodiments, the spinning station further comprises a second guide wheel positioned above and in front of said first guide wheel, wherein said first wire extends from said upper wire coil via said second guide wheel to said first guide wheel.

In one or more embodiments, the second guide wheel is mounted to the support.

As can be seen from FIG. 2, the first wire 132 is looped around the first guide wheel 170, whereby said first guide wheel 170 functions as a wire brake. To avoid that the first wire 132 gets stuck on the first guide wheel 170 during the operation of the cylinder unit 180, a second guide wheel 172 is positioned above and in front of the first guide wheel 170. Thereby, the first wire 132 extends from the upper wire coil 130 via said second guide wheel 172 to said first guide wheel 170. Furthermore, a third guide wheel 174 may be positioned below and in front of the first guide wheel 170 to secure the direction of the first wire 132 towards the spinner head unit 110.

In one or more embodiments, the spinning station further comprises a third guide wheel positioned below and in front of said first guide wheel, wherein said first wire extends from said first guide wheel to said third guide wheel.

In one or more embodiments, the third guide wheel is rotatably mounted on the second end of said first rod.

In one or more embodiments, the first guide wheel and said third guide wheel are rotatably mounted on a mutual bracket being part of said second end of said first rod.

In one or more embodiments, the cylinder unit further comprises a piston rod and a programmable control unit configured to control the action of said piston rod on said first rod, such as controlling whether the piston rod is in an extended or retracted position at a given moment in time and/or period. The movements of the piston rod 182 and the first rod 160 are shown with double arrows in FIG. 2.

Figure 3:
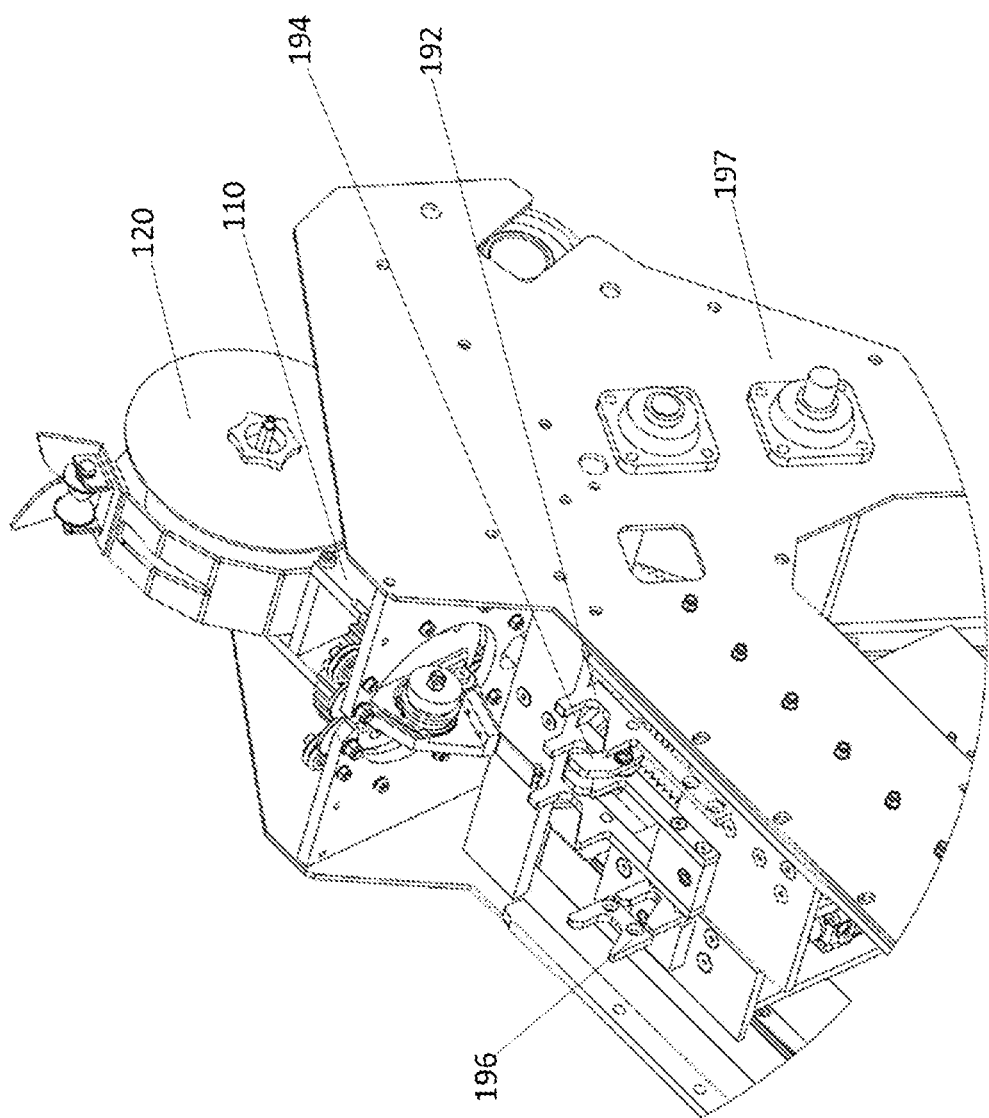
FIG. 3 is an enlarged view of a part of a spinning station showing a locking device in accordance with various embodiments of the invention.
Figure 4:
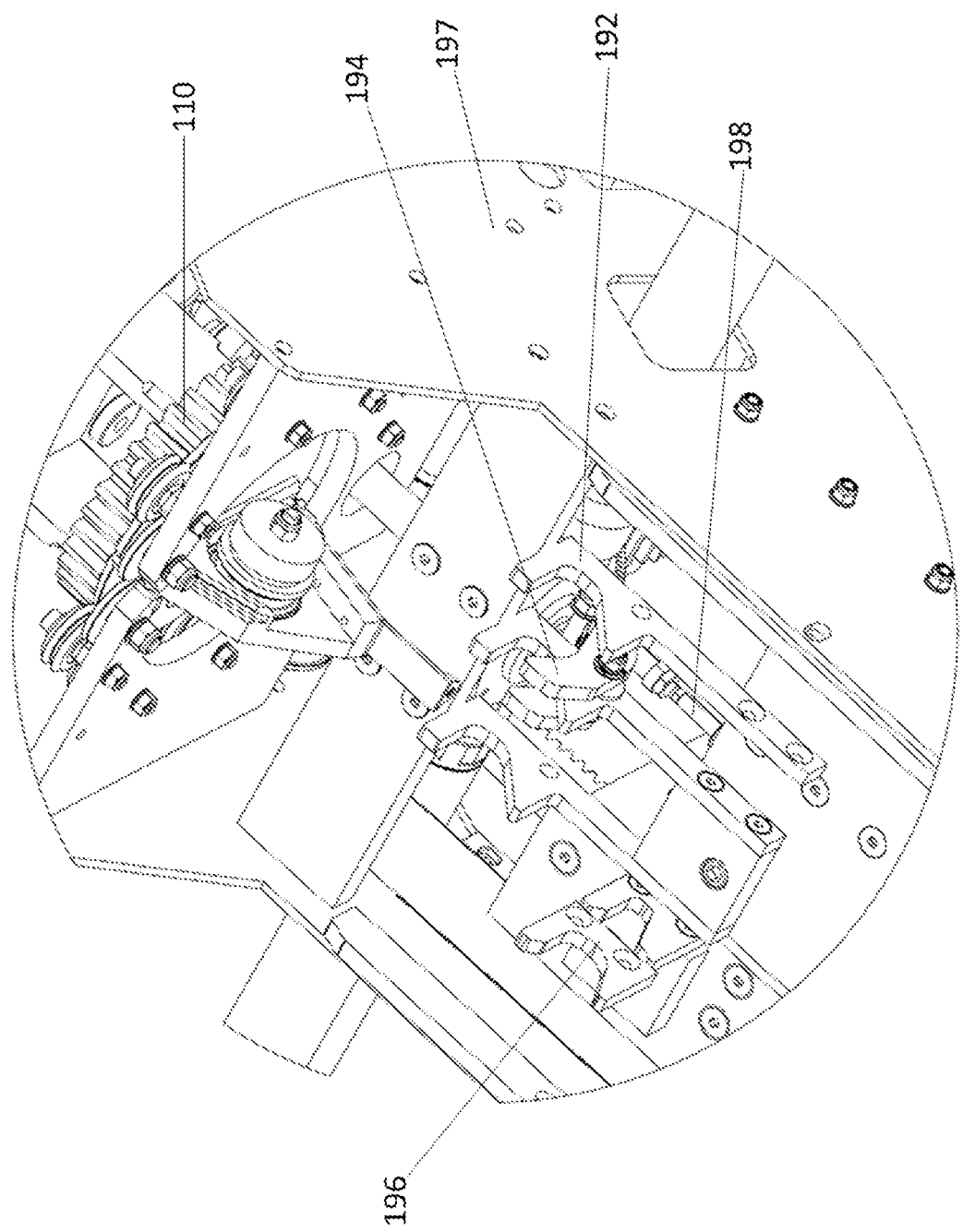
FIG. 4 is an enlarged view of a part of a spinning station showing a locking device in accordance with various embodiments of the invention.

As mentioned, the feeding means 150 is adapted for introducing a reinforcement rod (not shown) between the first 132 and second wires from a position laterally behind the spinner head unit 110 to a position laterally in front of said spinner head unit 110. The feeding means 150 may be adapted to feed reinforcement rods from a reinforcement rod rack 200 placed laterally behind the spinning stations to the site at the spinner head unit 110 where the first 132 and second wires are spun to form a wire binder. The feeding means 150 is in this embodiment an arm rotatably mounted on a chassis 197 of the spinning station and is provided with means 152 to pick up a reinforcement rod to grab or hold the reinforcement rod through its path from a position laterally behind the spinner head unit 110 towards a position laterally in front of the spinner head unit 110 and to release the reinforcement rod at the spinning site, preferably into a guide system 190 positioned in front of said spinner head unit 110 and adapted for receiving a reinforcement rod from said feeding means 150. At the spinning site the reinforcement rod may be placed by the feeding means 150 into a guide system 190 comprising a pick up gripper (FIGS. 3 and 4) 192. The pick up gripper 192 may be adapted to move down from an upper position close to the spinning site/twisting point towards a lower position further away from the spinning site/twisting point as the spinner head unit 110 spins the reinforcement rod into the wire binders of the mesh. When a reinforcement rod has been fixed to the wire binder by spinning, the guide system 190 may comprise a set of transport grippers 196 adapted for holding the individual reinforcement rods spun into the mesh as they are moved further away from the spinning site, e.g., towards a mesh rolling means. The spinning station may further comprise drive means for driving the spinner head unit 110, pick up gripper 192, and transport grippers 194. Preferably, the guide system 190 further comprises a locking device 194 adapted for fixating a reinforcement rod within said pick up gripper 192 during the operation of spinning the first 132 and second wire around said reinforcement rod and to subsequently form a wire spacer formed by spinning said two wires around one another. The locking device may be operated by a cylinder (pneumatic or hydraulic) 198, and may be configured as a hook, and the pick up gripper 192 may also be configured as a hook.

In one or more embodiments, the spinning station further comprises a guide system positioned in front of said spinner head unit and adapted for receiving a reinforcement rod from said feeding means from a position behind said spinner head unit.

In one or more embodiments, guide system comprises a pick up gripper. Preferably, the guide system further comprises a locking device adapted for fixating a reinforcement rod within said pick up gripper during the operation of spinning said first and a second wire around said reinforcement rod and to subsequently form a wire spacer formed by spinning said two wires around one another.

In one or more embodiments, the reinforcement rod is gradually moved away from the twisting point during the twisting operation. This operation may be performed by either the pick up gripper 192, and/or the transport grippers 196.

By shifting the execution direction of the twisting operation with the spinner head unit 110 between each formed wire spacer, the formed reinforcement mesh is perfectly straight. It is thought that the spinning operation displaces the reinforcement rod a little bit in one direction. Hence, if the spinning operations are performed in alternating directions, the displacement is offset.

In one or more embodiments, such as shown in FIG. 5, multiple spinning stations 100 arranged side-by-side are operated simultaneously at multiple sites along the length of each of a plurality of reinforcement rods positioned in continuation of each other. Thereby, reinforcement meshes wider than the individual reinforcement rods may be produced. Alternatively, a plurality of reinforcement meshes may be produced in line at the same time. In the latter situation, the reinforcement rods are positioned in continuation of each other and with a predetermined distance therebetween prior to activating the spinner head units. As mentioned above, FIG. 5 also shows (to the left of the maintenance door) a programmable control unit configured to control the synchronous activation of the multiple spinning stations.

The rod storage rack 200 may comprise shelves, e.g., for storing reinforcement rods having different properties with respect to length, diameter, or material properties. Thus, reinforcement rods may be chosen in order to provide reinforcement meshes having varying properties adapted for their end use.

A second aspect relates to an apparatus for manufacturing reinforcement meshes, the apparatus comprising:
- a plurality of spinning stations in accordance with the present invention, arranged in a side-by-side relationship; and
- a programmable control unit configured to control the synchronous activation of said spinning stations.

References

| | |
|---|---|
| 100 | Spinning station |
| 110 | Spinner head unit |
| 120 | Lower wire coil |
| 130 | Upper wire coil |
| 132 | First wire |
| 140 | Support |
| 150 | Feeding means |
| 160 | First rod |
| 162 | First end |
| 164 | Second end |
| 166 | Bracket |
| 170 | First guide wheel |
| 172 | Second guide wheel |
| 174 | Third guide wheel |
| 180 | Cylinder unit |
| 182 | Piston rod |
| 190 | Guide system |
| 192 | Pick up gripper |
| 194 | Locking device |
| 196 | Transport gripper |
| 197 | Chassis |
| 198 | Cylinder |

The invention claimed is:

1. A spinning station (100) for an apparatus for manufacturing reinforcement meshes, comprising:
   a spinner head unit (110) configured to spin a first and a second wire around a reinforcement rod and to subsequently form a wire spacer formed by spinning said two wires around one another;
   an upper wire coil (130), and a lower wire coil (120), respectively, said upper wire coil supplying said first wire and said lower wire coil (120) supplying said second wire; wherein said lower wire coil (120) is mounted on said spinner head unit (110);
   a support (140) extending above said spinner head unit (110); wherein said upper wire coil (130) is mounted to said support (140);
   feeding means (150) adapted for introducing a reinforcement rod between said first and second wires from a position behind said spinner head unit (110) to a position in front of said spinner head unit (110); wherein the
spinning station (100) further comprises:
   a first rod (160) having a first end (162) and a second opposing end (164), wherein said first end is hingedly connected to said support (140); and
   a first guide wheel (170) rotatably mounted on the second end (164) of said rod (160); wherein said first wire is looped around said first guide wheel (170), whereby said first guide wheel functions as a wire brake;
wherein the support (140) extends behind said spinner head unit (110); and wherein the spinning station (100) further comprises:
   a cylinder unit (180) operably connected to said first rod (160) and configured to control a spatial position of said first guide wheel (170) by acting on said first rod (160);
wherein said cylinder unit (180), by acting on said first rod (160), is configured to position said first guide wheel (170) in a first position where a part of said first wire extending between said spinner head unit (110) and said first guide wheel (170) is relatively tightened, and to position said first guide wheel (170) in a second position where a part of said first wire extending between said spinner head unit (110) and said first guide wheel (170) is relatively loosened;
wherein said first guide wheel is in the first position when the spinner head unit (110) is operating to form the wire spacer, and said first guide wheel is in the second position during the loading operation when the reinforcement rod, while being in contact with the first wire, is guided underneath the first wire by the feeding means (150) in a sliding motion.

2. The spinning station (100) according to claim 1, further comprising a second guide wheel (172) positioned above and in front of said first guide wheel (170), wherein said first wire extends from said upper wire coil (130) via said second guide wheel (172) to said first guide wheel (170).

3. The spinning station (100) according to claim 1, further comprising a second guide wheel (172) positioned above and in front of said first guide wheel (170), wherein said first wire extends from said upper wire coil (130) via said second guide wheel (172) to said first guide wheel (170), and wherein said second guide wheel (172) is mounted to said support (140).

4. The spinning station (100) according to claim 2, further comprising a third guide wheel (174) positioned below and in front of said first guide wheel (170), wherein said first wire (132) extends from said first guide wheel (170) to said third guide wheel (174).

5. The spinning station (100) according to claim 2, further comprising a third guide wheel (174) positioned below and in front of said first guide wheel (170), wherein said first wire (132) extends from said first guide wheel (170) to said third guide wheel (174); and wherein said third guide wheel (174) is rotatably mounted on the second end (164) of said first rod (160).

6. The spinning station (100) according to claim 1, further comprising a third guide wheel (174) positioned below and in front of said first guide wheel (170), wherein said first wire extends from said first guide wheel (170) to said third guide wheel (174); wherein said third guide wheel (174) is rotatably mounted on the second end (164) of said first rod (160); and wherein said first guide wheel (170) and said third guide wheel (174) are rotatably mounted on a mutual bracket (166) part of said second end (164) of said first rod (160).

7. The spinning station (100) according to claim 1, wherein said cylinder unit (180) further comprises a piston rod (182) and a programmable control unit configured to control an action of said piston rod (182) on said first rod (160) for controlling whether the piston rod (182) is in an extended or retracted position at a given moment in time or a given period of time.

8. The spinning station (100) according to claim 1, further comprising a guide system (190) positioned in front of said spinner head unit (110) and adapted for receiving a reinforcement rod from said feeding means (150) from a position behind said spinner head unit (110).

9. The spinning station (100) according to claim 1, further comprising a guide system (190) positioned in front of said spinner head unit (110) and adapted for receiving a reinforcement rod from said feeding means (150) from a position behind said spinner head unit (110); and wherein said guide system comprises a pick up gripper (192) and a locking device (194) adapted for fixating a reinforcement rod within said pick up gripper (192) during the operation of spinning said first and second wire around said reinforcement rod and to subsequently form a wire spacer formed by spinning said two wires around one another.

10. An apparatus for manufacturing reinforcement meshes, said apparatus comprising:
  a plurality of spinning stations (100) according to claim 1, arranged in a side-by-side relationship; and
  a programmable control unit configured to control the synchronous activation of said spinning stations.

* * * * *